United States Patent [19]
McCabe et al.

[11] Patent Number: 5,741,426
[45] Date of Patent: Apr. 21, 1998

[54] METHOD FOR TREATMENT OF CONTAMINATED WATER

[76] Inventors: Derald L. McCabe; Jack K. Helm, both of P.O. Box 964, Gatesville, Tex. 76528

[21] Appl. No.: 567,433

[22] Filed: Dec. 5, 1995

[51] Int. Cl.⁶ .................................................. C02F 1/463
[52] U.S. Cl. .............................. 210/707; 95/266; 96/199; 205/743; 205/755; 205/756; 210/709; 210/717; 210/718; 210/726; 210/737; 210/738; 210/744; 210/748; 210/801; 210/802
[58] Field of Search .............................. 95/266; 96/193, 96/199, 201; 204/149, 150; 210/702, 707, 709, 716, 717, 726, 718, 721, 737, 738, 744, 801, 748, 802, 188, 218, 519, 521, 522; 205/743, 755, 756

[56] References Cited

U.S. PATENT DOCUMENTS

| | | | |
|---|---|---|---|
| 2,047,989 | 7/1936 | Woelflin | 210/519 |
| 2,181,684 | 11/1939 | Walker | 210/521 |
| 2,261,101 | 10/1941 | Erwin | 210/522 |
| 2,360,811 | 10/1944 | Kelly et al. | 210/188 |
| 3,224,593 | 12/1965 | Nebolsine | 210/519 |
| 4,202,767 | 5/1980 | Alfenaar | 210/716 |
| 4,400,280 | 8/1983 | Larsson et al. | 210/802 |
| 4,406,789 | 9/1983 | Brignon | 210/519 |
| 4,686,009 | 8/1987 | McCabe | 202/176 |
| 5,474,688 | 12/1995 | Hedrick et al. | 210/802 |

OTHER PUBLICATIONS

1 Sheet of Drawings entitled "Alice Tower".

*Primary Examiner*—Peter A. Hruskoci
*Attorney, Agent, or Firm*—Guy McClung

[57] ABSTRACT

A method and apparatus for treatment of contaminated water, containing undesired solid, liquid, and/or gaseous materials includes an electro-flocculation means for disassociating ions from the undesired solid material and from the contaminated water, and further includes a separation tower having various deflection means deflecting undesired solid materials downwardly through to the separation tower.

11 Claims, 3 Drawing Sheets

METHOD FOR TREATMENT OF CONTAMINATED WATER

BACKGROUND OF THE INVENTION

1. Field of the Invention

The invention relates to a method and apparatus for treating contaminated water, and in particular for treating contaminated water containing undesired solid, liquid, and gaseous materials, whereby the treated water meets discharge standards which permit the water to be discharged into public sewer systems, or similar systems.

2. Description of the Prior Art

As a result of various manufacturing operations, mining operations, and oil and gas field operations, water used in such operations becomes contaminated with undesired solid, liquid, and/or gaseous materials, including, but not limited to, various minerals, hydrocarbons, and liquids which are lighter than water, such as oils, vegetable oils, etc. Such contaminated water does not meet various governmental standards for permitting the discharge of such contaminated water directly into public sewer systems, or similar facilities, wherein the water may be purified for reuse, or merely discharged into lakes, oceans or streams. Before contaminated water can be so discharged, or used in subsequent water purification processes, the water must be first treated to remove such undesired solid, liquid, and/or gaseous materials before the water meets various governmental discharge standards.

Various types of equipment and processes have been proposed for treating contaminated water, and such previously known equipment and processes generally suffer from one disadvantage, or another, including, but not limited to, excessive costs per gallon of contaminated water treated, high maintenance and repair requirements for the equipment, and/or fouling or decay of various types of filters.

Accordingly, prior to the development of the present invention, there has been no apparatus or method for treatment of contaminated water, containing undesired solid, liquid, and/or gaseous materials, which: are economical to manufacture and use; do not require extensive maintenance and/or repairs; and which do not utilize filters which may become fouled and/or decayed. Therefore, the art has sought a method and apparatus for treatment of contaminated water, containing undesired solid, liquid, and/or gaseous materials, which: is economical to manufacture and use; does not require extensive maintenance and repairs; and which does not use filters which may become fouled and/or decayed.

SUMMARY OF THE INVENTION

In accordance with the invention, the foregoing advantages have been achieved through the present apparatus for treatment of contaminated water, containing undesired solid, liquid, and/or gaseous materials. The present invention may include: a first electro-floculation means for disassociating ions from the undesired solid material and contaminated water and for releasing undesired gaseous materials contained in the contaminated water; a holding tank, having first and second ends, for the contaminated water in fluid communication with the first electro-floculation means, the holding tank including a means for venting the undesired gaseous materials from the contaminated water, and having a means for removing undesired solid materials from the contaminated water; and a separation tower, having upper and lower ends and a longitudinal axis, in fluid communication with the holding tank. In accordance with the present invention, the separation tower may include: a first contaminated water inlet means for feeding the contaminated water from the holding tank into the separation tower; a means for applying a vacuum to the separation tower for drawing the contaminated water through the contaminated water inlet means and upwardly into, and through, the separation tower and for removing undesired gaseous materials from the contaminated water; a means for removing undesired solid materials from the contaminated water in the separation tower; a first deflection means for deflecting undesired solid materials in the contaminated water downwardly toward the lower end of the separation tower, the first deflection means being disposed proximate the upper end of the separation tower and above the first contaminated water inlet means; a second deflection means for deflecting undesired solid materials in the contaminated water downwardly toward the lower end of the separation tower, the second deflection means being disposed proximate the lower end of the separation tower and above the first contaminated water inlet means; a treated water outlet means for removing treated water from the separation tower, the treated water outlet means being disposed proximate the upper end of the separation tower and above the first deflection means; and an undesired liquid material outlet means for removing undesired liquid materials from the separation tower, the undesired liquid material outlet means being disposed proximate the upper end of the separation tower and above the treated water outlet means.

In accordance with this aspect of the present invention, the apparatus may include a temperature modification means for modifying the temperature of the contaminated water in the separation tower, the temperature modification means being disposed proximate the upper end of the separation tower, whereby upon heating the contaminated water, undesired liquid materials will tend to be separated from the contaminated water and rise toward the upper end of the separation tower, or upon cooling the contaminated water, the undesired solid materials will be cooled and tend to move downwardly toward the lower end of the separation tower. The temperature modification means may be a heat exchanger disposed in the separation tower in direct contact with the contaminated water, and is disposed below the first deflection means.

Another feature of this aspect of the present invention is that the first and second deflection means may each include a plurality of deflection members disposed within the separation tower, the deflection members being disposed in at least two generally parallel rows, with the deflection members of adjacent rows of deflection members being disposed in a staggered relationship with each other. An additional feature of this aspect of the present invention may include a third means for deflecting undesired solid material in the contaminated water downwardly toward the lower end of the separation tower, the third deflection means being disposed generally intermediate the first and second ends of the separation tower and above the first contaminated water inlet means. The third deflection means may include a plurality of baffle plates in a spaced apart relationship, and disposed within the separation tower, with at least some of the baffle plates angularly disposed with respect to the longitudinal axis of the separation tower and sloping downwardly toward the lower end of the separation tower, at least some of the plurality of baffle plates defining a generally serpentine first fluid passageway through which the contaminated water flows, and undesired solid materials striking the baffle plates are directed downwardly toward the lower end of the separation tower.

A further feature of this aspect of the present invention is that the separation tower may include a second fluid passageway in fluid communication with the upper and lower ends of the separation tower and in fluid communication with the first fluid passageway defined by at least some of the baffle plates, whereby as the contaminated water flows upwardly through the first fluid passageway, some deflected undesired solid materials pass into the second fluid passageway and downwardly into the lower end of the separation tower. Another feature of this aspect of the present invention is that a second electro-flocuation means for disassociating ions from the undesired solid materials and contaminated water for releasing undesired gaseous materials contained in the contaminated water may be provided, and the first and second electro-flocuation means may be a cathode and an anode which pass an electrical current through the contaminated water as the contaminated water flows by the cathode and anode.

In accordance with another aspect of the present invention, the foregoing advantages have also been achieved through the present method for treating contaminated water, containing undesired solid, liquid, and/or gaseous materials. This aspect of the present invention may include the steps of: disassociating ions from the undesired solid material and contaminated water and releasing undesired gaseous materials contained in the contaminated water by flowing the contaminated water through a first electro-flocuation means; flowing the contaminated water into a holding tank, having first and second ends, and venting the undesired gaseous materials from the holding tank; feeding the contaminated water from the holding tank into a separation tower, having upper and lower ends, by applying a vacuum to the separation tower to draw the contaminated water upwardly through the separation tower and removing undesired gaseous materials from the contaminated water by the vacuum; as the contaminated water is drawn upwardly through the separate tower, flowing the contaminated water against a first deflection means to deflect undesired solid materials downwardly toward the lower end of the separation tower; flowing the contaminated water against a second deflection means to deflect undesired solid materials downwardly toward the lower end of the separation tower; removing treated water from the separation tower from a first location proximate the upper end of the separation tower and above the first and second deflection means; and removing undesired liquid material from the separation tower from a second location proximate the upper end of the separation tower and above the first location.

Another feature of this aspect of the present invention may include the step of modifying the temperature of the contaminated water in the separation tower with a temperature modification means disposed proximate the upper end of the separation tower, whereby upon heating the contaminated water, undesired liquid materials will tend to be separated from the contaminated water and rise toward the upper end of the separation tower, and upon cooling the contaminated water, undesired solid materials will be cooled and tend to move downwardly toward the lower end of the separation tower. A heat exchanger may be utilized as the temperature modification means, the heat exchanger being disposed in the separation tower in direct contact with the contaminated water, and disposed below the first deflection means. A further feature of this aspect of the present invention may include the steps of utilizing as the first and second deflection means, a plurality of deflection members disposed within the separation tower, and disposing the deflection members in at least two generally parallel rows, with the deflection members of adjacent rows of deflection members being disposed in a staggered relationship with respect to each other.

A further feature of this aspect of the present invention may include the steps of flowing the contaminated water against a third means to deflect undesired solid materials in the contaminated water downwardly toward the lower end of the separation tower; and disposing the third deflection means generally intermediate the first and second ends of the separation tower.

An additional feature of this aspect of the present invention may include the steps of utilizing as the third deflection means a plurality of baffle plates in a spaced apart relationship, and disposed within the separation tower, and angularly disposing at least some of the baffle plates with respect to the longitudinal axis of the separation tower and sloping at least some of the baffle plates downwardly toward the lower end of the separation tower, with at least some of the plurality of baffle plates defining a generally serpentine first fluid passageway; and flowing the contaminated water upwardly through the first fluid passageway to cause undesired solid materials striking the baffle plates to be directly downwardly toward the lower end of the separation tower.

Another feature of this aspect of the present invention may include the steps of providing the separation tower with a second fluid passageway in fluid communication with the upper and lower ends of the separation tower and in fluid communication with the first fluid passageway defined by at least some of the baffle plates; and flowing the contaminated water upwardly through the first fluid passageway, and deflecting some undesired solid materials into the second fluid passageway and downwardly into the lower end of the separation tower.

Another feature of this aspect of the present invention may include the steps of providing a second electro-flocuation means, and disassociating ions from the undesired solid materials and contaminated water and releasing undesired gaseous materials contained in the contaminated water. A cathode and an anode may be utilized for each of the first and second electro-flocuation means, and an electrical current is passed through the contaminated water as the contaminated water flows by the cathode and anode.

The method and apparatus for treatment of contaminated water, containing undesired solid, liquid, and/or gaseous materials of the present invention, when compared with previously proposed prior art methods and apparatus have the advantages of: being economical to manufacture and use to treat contaminated water; not requiring extensive maintenance and/or repairs; and not requiring the use of various types of filters which may become fouled and/or decayed.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

Figure 1:
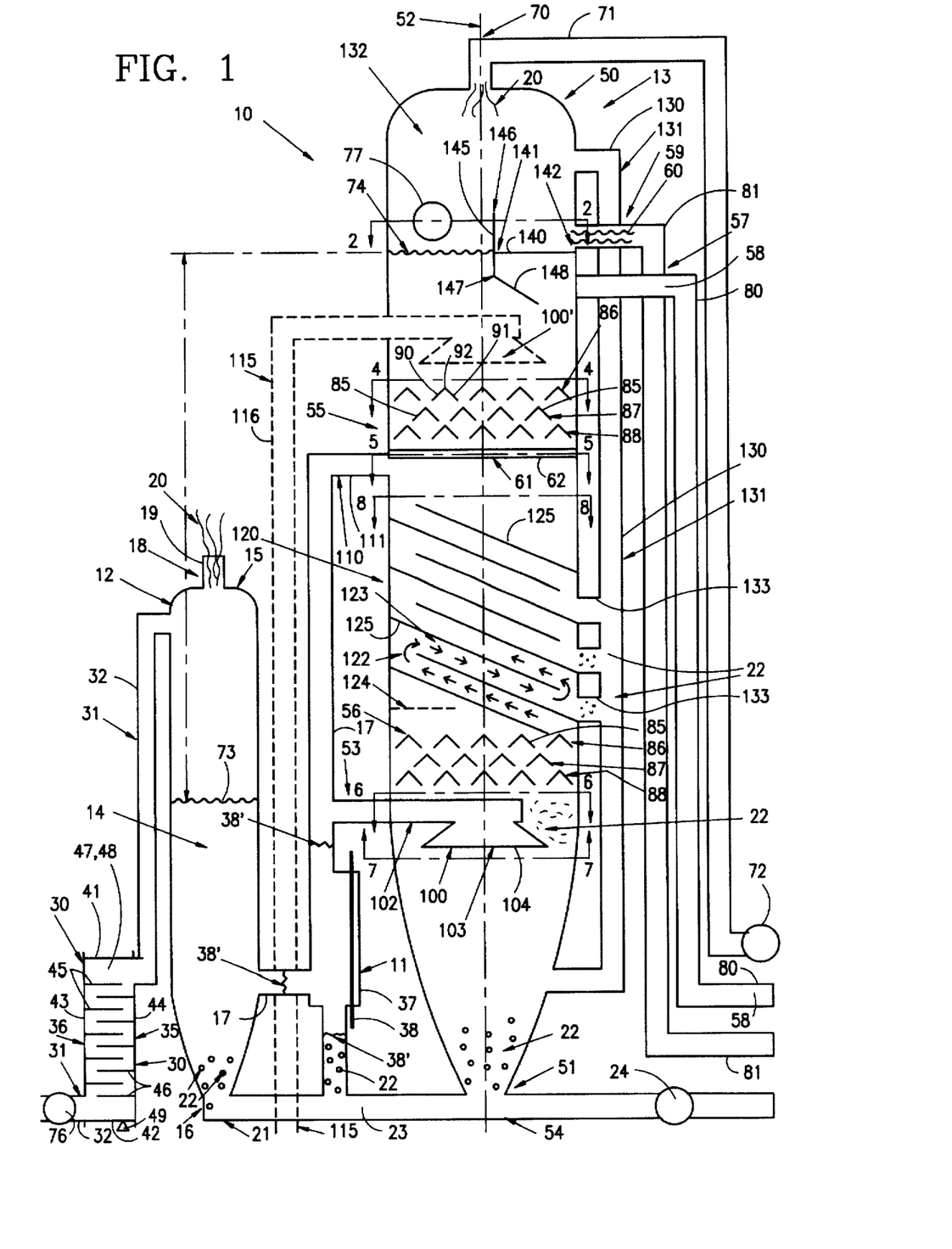
FIG. 1 is a partial cross-sectional view of one embodiment in accordance with the present invention of an apparatus for treatment of contaminated water.

With reference to FIG. 1, the apparatus 10 of the present invention for treatment of contaminated water, containing undesired solid, liquid, and/or gaseous materials, generally includes: a first electro-floculation means 11; a holding tank 12; and a separation tower 13. As will be hereinafter described in greater detail, various fluid passageways are disposed between various fluid passageways, or pipes, and are in fluid communication with, and between, holding tank 12, and separation tower 13. As seen in FIGS. 2–8, separation tower 13, as well as holding tank 12, generally have a circular cross-sectional configuration; however, it will be readily apparent to one of ordinary skill in the art, that holding tank 12 and separation tower 13 could have any desired cross-sectional configuration, such as square, oval, rectangular, etc., although a circular cross-sectional configuration is preferred. Likewise, the various fluid passageways, or pipes, as will be hereinafter described in greater detail, disposed in fluid communication with, and between, holding tank 12, and separation tower 13 also preferably have a circular cross-sectional configuration, but it will be readily apparent to one of ordinary skill in the art that such fluid passageways, or pipes, could have any desired cross-sectional configuration, such as oval, square, triangular, etc. Unless hereinafter indicated, all of the components of water treatment apparatus 10 may be made of any suitable material having the requisite strength characteristics to function as holding tank 12 and separation tower 13, as well as in the case of separation tower 13, to withstand the vacuum pressure forces exerted upon separation tower 13. Accordingly, the various components of apparatus 10, unless a specific material is hereinafter set forth, may be made of commercially available metallic materials, such as various types of steel, or various plastic materials, which are well known and commercially available. Since the contaminated water is only being treated to remove sufficient amounts of undesired solids, liquid, and/or gaseous materials to render the contaminated water in compliance with various governmental discharge standards, it is not necessary that any of the components of apparatus 10 be constructed of stainless steel, unless the extra durability and corrosion resistant characteristics of stainless steel are desired.

Still with reference to FIG. 1, holding tank 12 contains a quantity of contaminated water 14, which may be pumped into holding tank 12 by a conventional pump 76 in a conventional manner. Holding tank 12 has first and second, or upper and lower, ends 15, 16 and is in fluid communication with the first electro-floculation means 11, as by a conventional pipe, or fluid passageway, 17, disposed intermediate its first and second ends 15, 16. The upper end 15 of holding tank 12 is provided with a means for venting 18, or vent pipe 19, for venting undesired gaseous materials, or vapors, 20 from the contaminated water 14. Holding tank 12 is preferably provided with a means for removing 21 undesired solid materials 22 from the contaminated water 14, which solid materials 22 may precipitate from the contaminated water 14 in holding tank 12, and fall downwardly toward the lower end 16 of holding tank 12, and into removal means 21. Removal means 21 may be a conventional pipe 23 in fluid communication with the lower end 16 of holding tank 12, and the undesired solid materials 22 may be removed by operation of a conventional pump, or sludge pump, 24 disposed in fluid communication with pipe 23.

Still with reference to FIG. 1, the water treatment apparatus 10 may be provided with a second electro-floculation means 30 which is disposed in fluid communication with the holding tank 12, and is disposed in a contaminated water inlet means 31 for holding tank 12; contaminated water inlet means 31, preferably being a conventional pipe 32 which is preferably connected proximate the upper end 15 of holding tank 12. First and second electro-floculation means 11, 30 act to disassociate ions from the contaminated water 14 passing through the electro-floculation means 11, 30, as well as to disassociate ions attached to the undesired solid material 22 contained in the contaminated water 14. The electro-floculation means 11, 30 further act to release undesired gaseous materials 20 contained in the contaminated water 14. The electro-floculation means 11, 30 cause a release of H+ and OH radicals, or ions, as well as may create an amount of ozone gas ($O_3$). These three radicals act as scavenging agents to neutralize organic material contained in the contaminated water 14, and allow for further removal of undesired materials, either by settling of the undesired solid materials 22, or by undesired gaseous materials 20 being released. Each electro-floculation means 11, 30 includes a cathode 35 and an anode 36 in electrical connection with a suitable source of direct current, which thus pass an electrical current through the contaminated water 14 as it flows by the cathode and anode 35, 36. The first electro-floculation means 11 generally includes an elongate, tubular-shaped anode outer housing 37, formed of a suitable metallic material, and tubular housing 37 is disposed within pipe 17, which is in fluid communication between holding tank 12 and separation tower 13. Tubular housing 37 is electrically insulated, in a conventional manner, as shown schematically at 38', from pipe 17. A rod-shaped cathode 38 passes through the tubular-shaped anode housing 37, and the cathode is connected in a suitable manner to a source of direct current. The lower end of electro-floculation means 11 may be provided with a pipe 39 in fluid communication with pipe 23, whereby any undesired solid materials 22 which precipitate out of contaminated water 14, fall downwardly through pipe 39 into pipe 23, and may be removed by operation of sludge pump 24.

The second electro-floculation means 30 may be constructed of upper and lower plate members 41 and 42 constructed of a suitable electrically insulating plastic material, and metallic side plates 43 and 44, each side plate 43 and 44 having a plurality of metallic plate members 45, and 46 fixedly secured thereto in an electrically conducting manner. Side plate 43 and its associated plate members 45 function as anode 36, and side plate member 44 and its associated plate 46 act as cathode 35. A suitable direct current source (not shown) is connected to cathode 35, to pass an electrical current through the contaminated water 14 as it flows by the cathode 35 and anode 36. The second electro-floculation means 30 may have any suitable cross-sectional configurations; however, it is preferred that its cross-sectional configuration be either square or rectangular, with the upper and lower plate members 41, 42 and rectangular-shaped front and rear panels 47, 48 being formed of a suitable electrically insulated plastic material, whereby the side plates 43, 44 of anode and cathode 36, 35 are insulated from each other. A conventional drain plug 49 may be provided at the lower end of electro-floculation means 30 to permit precipitated undesired solid materials 22 be removed from electro-floculation means. Any undesired gaseous materials 20 released by the operation of the second electro-floculation means 30 may be vented from the holding tank 12 through the vent means 18 at the upper end 15 of holding tank 12, in the manner previously described.

Still with reference to FIG. 1, separation tower 13 has upper and lower ends 50, 51 and a longitudinal axis 52, and separation tower 13 is disposed in fluid communication with holding tank 12, as by pipe, or fluid passageway, 17. Separation tower 13 preferably includes a first contaminated water inlet means 53 for feeding the contaminated water 14 from the holding tank 12 into separation tower 13, as will be hereinafter described in further detail. Separation tower 13 includes a means for applying a vacuum 70 to the separation tower 13 for drawing the contaminated water 14 through the contaminated water inlet means 53 and upwardly into, and through, the separation tower 13. The vacuum applying means 70 further serves to remove undesired gaseous materials 20 from the contaminated water 14. A means for removing 54 undesired solid materials from the contaminated water 14 in the separation tower 13 is preferably disposed at the lower end 51 of separation tower 13. A first deflection means 55 for deflecting undesired solid materials 22 downwardly toward the lower end 51 of the separation tower 13 is preferably provided, and is disposed proximate the upper end 50 of the separation tower 13 and above the first contaminated water inlet means 53. A second deflection means 56 for deflecting undesired solid materials 22 in the contaminated water 14 downwardly toward the lower end 51 of the separation tower 13 is preferably disposed proximate the lower end 51 of the separation tower 13, and above the first contaminated water inlet means 53. Separation tower 13 is also preferably provided with a treated water outlet means 57 for removing treated water 58 from the separation tower 13, and the treated water outlet means 57 is preferably disposed proximate the upper end 50 of separation tower 13 and above the first deflection means 55. Separation tower 13 is also preferably provided with an undesired liquid material outlet means 59 for removing undesired liquid materials 60 from separation tower 13, and the undesired liquid material outlet means 59 as preferably disposed proximate the upper end 50 of the separation tower 13, and is preferably disposed above the treated water outlet means 58.

Figures 2, 3, 4, 5, 8:
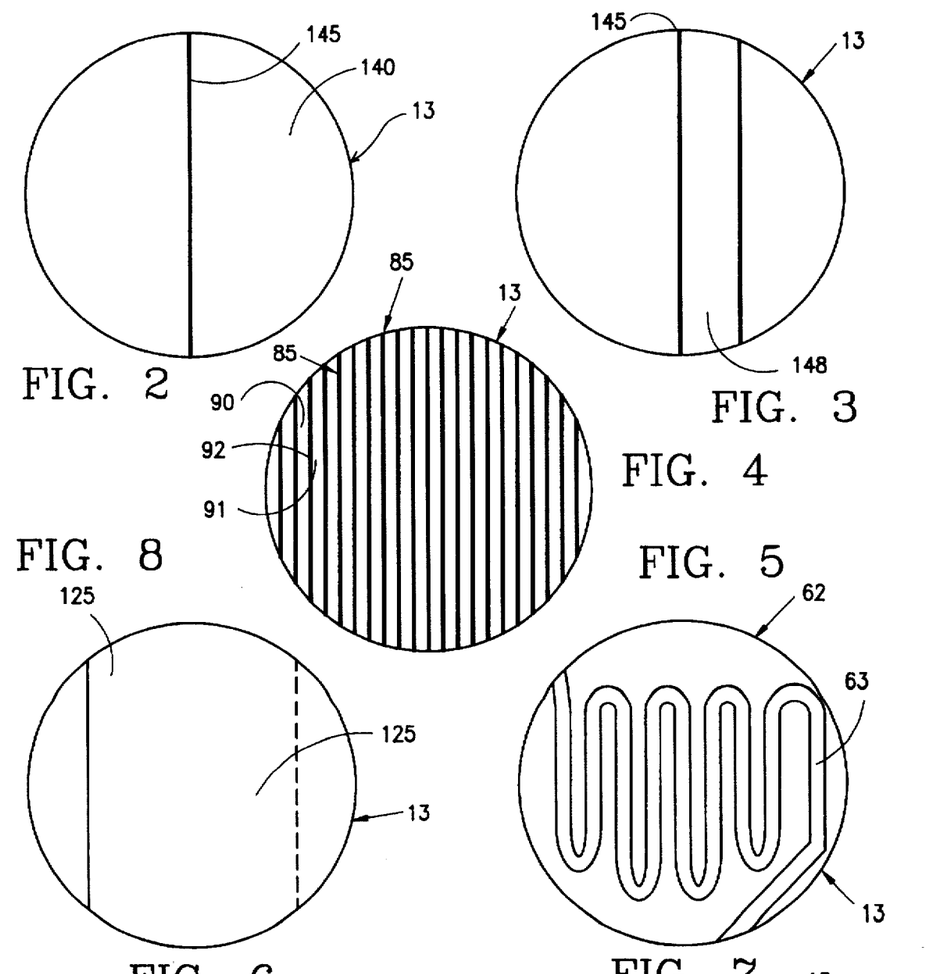
FIG. 2 is a partial cross-sectional view taken along line 2—2 of FIG. 1.
FIG. 3 is a partial cross-sectional view taken along line 3—3 of FIG. 1.
FIG. 4 is a partial cross-sectional view taken along line 4—4 of FIG. 1.
FIG. 5 is a partial cross-sectional view taken along line 5—5 of FIG. 1.
FIG. 8 is a partial cross-sectional view taken along line 8—8 of FIG. 1.

Still with reference to FIG. 1, separation tower 13 may be provided with a temperature modification means 61 for modifying the temperature of the contaminated water 14 in the separation tower 13, the temperature modification means 61 being disposed proximate the upper end 50 of the separation tower 13. As will be hereinafter described in greater detail, if heat is supplied to the contaminated water 14 by temperature modification means 61, undesired liquid materials 59 will tend to be separated from contaminated water 14 and rise towards the upper end 50 of the separation tower 13. If heat is removed from the contaminated water 14 by temperature modification means 61, whereby the contaminated water 14 is cooled, undesired solid materials 22 contained in contaminated water 14 will be cooled and will tend to move downwardly toward the lower end 51 of the separation tower 13. As seen in FIG. 5, temperature modification means 61 is preferably a heat exchanger 62 disposed in the separation tower 13 in direct contact with contaminated water 14, and is disposed below the first deflection means 55. Preferably, heat exchanger 62 is a tube-type, pancake-shaped heat exchanger coil 63, through which a heat exchanger fluid medium, such as water, may be pumped. If cooling is desired, cooled water is pumped through heat exchanger coil 63, in a conventional manner; and if heating of contaminated water 14 is desired, heated water may be pumped in a conventional manner through heat exchanger coil 63.

With reference to FIG. 1, vacuum applying means 70 preferably includes a conventional pipe 71 in fluid communication with the upper end 50 of separation tower 13, and includes a conventional vacuum pump 72 disposed in association with pipe 71. Upon the operation of vacuum pump 72, a vacuum is drawn upon the interior of separation tower 13, which creates a vacuum chamber 132 at the upper end 50 of tower 13, which draws contaminated water 14 into separation tower 13 via the first contaminated water inlet means 53. Preferably, the vacuum force is approximately 29"–29.5" of mercury which will pull, or draw, a column of contaminated water into separation tower 13 a distance of approximately 32 feet measured from the top of the contaminated water level 73 in holding tank 12 to the top of the contaminated water level 74 in separation tower 13, as indicated by arrow 75. In this regard, the contaminated water level 73 in holding tank 12 may be considered a predetermined barometric standoff point. By coordinating the contaminated water level 73, or barometric standoff point in holding tank 12, with the operation of vacuum pump 72, the contaminated water level 74 within separation tower 13 may be controlled. The conventional pump 76 may also be used to initially pump contaminated water 14 into holding tank 12. A conventional water level sensor, or meter, 77 may be provided and operated in a conventional manner in connection with vacuum pump 72 and pump 76 to maintain the desired water levels 73, 74.

Still with reference to FIG. 1, treated water outlet means 57 and desired liquid material outlet means 59 may preferably be conventional pipes 80, 81, connected to separation tower 13, proximate the upper end 50 of separation tower 13. Undesired liquid materials 60 are generally materials having a lower specific density than water, or are lighter than water, whereby upon such undesired liquid materials, 60 being separated from contaminated water 14, such undesired liquid materials tend to float to the top of the contaminated water 40, and are generally located at the contaminated water level 74 within separation tower 13. Examples of undesired liquid materials include, but are not limited to, vegetable oils, and various types of liquid hydrocarbons. If desired, suitable fluid pumps (not shown) may be provided in association with pipes 80 and 81 of treated water outlet means 57 and undesired liquid material outlet means 59, in a conventional manner.

With reference to FIGS. 1 and 4, first and second deflection means 55, 56 may each include a plurality of deflection members 85 disposed within the separation tower 13, with the deflection members 85 being disposed in at least two generally parallel rows 86–88, with the deflection members 85 of adjacent rows, for example rows 86 and 87, being disposed in a staggered relationship with each other, as shown in FIG. 1. Preferably, the deflection members 85 are each a generally elongate V-shaped member 89 having two wall surfaces 90 and 91, with the two wall surfaces 90, 91 sloping downwardly and outwardly toward the lower end 51 of the separation tower 13. The two wall surfaces 90, 91, meet at an apex 92, and as seen in FIG. 1, the apexes 92 of the deflection members 85 of one row, such as row 87 are disposed toward the lower ends of wall surfaces 90, 91, of the adjacent row, such as row 86, whereby the apexes 92 of adjacent rows of deflection members 85 are laterally offset, or staggered, from each other. Any number of rows of deflection members 85 may be utilized in first and second deflection means 55, 56; however, first deflection means 55 preferably includes approximately nine rows of deflection members 85, and the second deflection means 56 preferably includes approximately three rows of deflection members 85. Conventional lengths of angle iron may be utilized for deflection members 85. As contaminated water 14 within separation tower 13 moves upwardly within separation tower 13, the first and second deflection means 55, 56 are disposed in the path of the upwardly moving water. Undesired solid materials contained within contaminated 14, upon striking the underside of deflection members 85, are deflected downwardly toward the lower end 51 of separation tower 13, where they settle in the lower end 51 of separation tower 13 and may be removed from separation tower 13 by the operation of sludge pump 24, as previously described.

Figure 6:
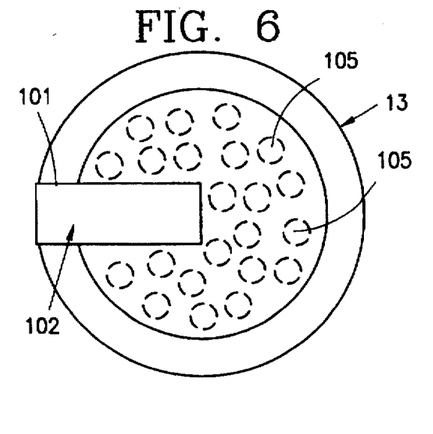
FIG. 6 is a partial cross-sectional view taken along line 6—6 of FIG. 1.
Figure 7:
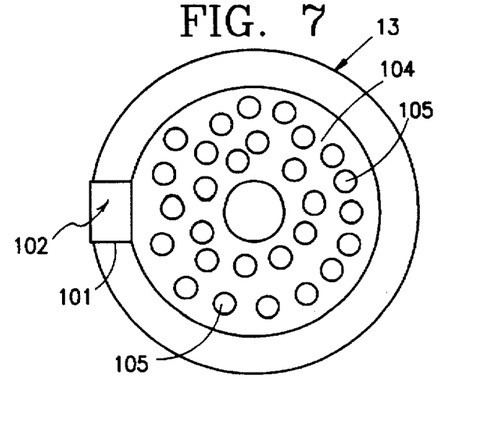
FIG. 7 is a partial cross-sectional view taken along line 7—7 of FIG. 1.

With reference to FIGS. 1, 6, and 7, the first contaminated water inlet means 53 is preferably a means for spraying 100 the contaminated water 14 into the separation tower 13. The first contaminated water inlet means 53 preferably includes a conventional pipe 101 in fluid communication with pipe 17, and pipe 101, at its end 102, has a nozzle 103 which preferably includes a plate member 104 having a plurality of perforations 105 formed therein, whereby the contaminated water 14 passes through pipe 101 and then through the plurality of perforations 105 and is sprayed in a generally downwardly direction toward the lower end 51 of separation tower 13. Spraying means 100 of first contaminated water inlet means 53 generally serves to make the flow of contaminated water 14 into the lower end 51 of separation tower 13 more uniform and directed in a downward direction, to aid in the separation of the undesired solid materials 22 within separation tower 13.

A second contaminated water inlet means 110 may also be provided for feeding contaminated water 14 into separation tower 13, the second contaminated water inlet means 110 being disposed intermediate the upper and lower ends 50, 51 of separation tower 13, and preferably above the second deflection means 56. Second contaminated water inlet means 110 may include a pipe 111 in fluid communication with pipe 17, and contaminated water 14 may merely flow into the separation tower 13. Alternatively, the second contaminated water inlet means may also include a spraying means 100 as previously described in connection with first contaminated water inlet means 53. Water treatment apparatus 10 may also be provided with a third contaminated water inlet means 115, which includes a separate contaminated water inlet pipe 116 in fluid communication with another spraying means 100 which is of the same construction as the spraying means 100 of first contaminated water inlet means 53, previously described. This additional, or third, contaminated water inlet means 115 is preferably disposed above the first deflection means 55, as shown in FIG. 1, and preferably proximate the upper end 50 of separation tower 13.

With reference to FIGS. 1 and 8, separation tower 13 may be provided with a third means for deflecting 120 undesired solid material 22 in the contaminated water in a direction downwardly toward the lower end of the separation tower 13. The third deflection means 120 is preferably disposed at a location generally intermediate the first and second ends 50, 51 of separation tower 13 and above the first contaminated water inlet means 53. Preferably, the third deflection means 120 includes a plurality of baffle plates 121 disposed in a spaced apart relationship, with at least some of the baffle plates 121 being angularly disposed with respect to the longitudinal axis 52 of the separation tower. Preferably, some of the baffle plates 121 slope downwardly toward the lower end 51 of the separation tower 13, whereby at least some of the baffle plates 121 define a generally serpentine first fluid passageway 122, as shown in phantom lines 123, through which the contaminated water 14 flows. As also seen in FIG. 1, a baffle plate could be disposed substantially perpendicular to the longitudinal axis 52 of separation tower 13, as illustrated in FIG. 1 as at phantom lines 124. However, preferably all of the baffle plates 121 are angularly disposed as illustrated for baffle plates 121 in FIG. 1. As the contaminated water is drawn upwardly within separation tower 13 by the operation of vacuum pump 72, undesired solid materials 22 within contaminated water 14 strike the underside of the baffle plates 121 and are thus directed downwardly toward the lower end 51 of separation tower 13. Preferably, baffle plates 121 are angularly disposed within a range of from 1° to 45° with respect to the longitudinal axis 52 of tower 13.

Preferably, separation tower 13 includes a second fluid passageway 130 in fluid communication with the first fluid passageway 122 defined by baffle plates 121, the second fluid passageway 130 being in fluid communication with the upper and lower ends 50, 51 of the separation tower 13. Preferably, the second fluid passageway 130 is a pipe 131 disposed outside separation tower 13 in fluid communication with the vacuum chamber 132 at the upper end 50 of separation tower 13, and the lower end 51 of separation tower 13. Preferably, the second fluid passageway 130 is also in fluid communication with the first fluid passageway 122 defined by at least some of the baffle plates 121, as by pipes 133. Thus, as the contaminated water 14 flows upwardly through the first fluid serpentine passageway 122 of the third deflection means 120, at least some of the deflected, undesired solid materials 22 may pass through pipes 133 into the second fluid passageway 130, or pipe 131, and may flow downwardly into the lower end 51 of the separation tower, and then be removed either continuously, or periodically, by the operation of sludge pump 24. It should be noted that as the contaminated water 14 flows upwardly through the serpentine first fluid passageway 122, and makes the turns at the ends 125 of baffle plates 121, a slight centrifical force acts upon the contaminated water, and causes heavier, undesired solid materials 22 to be forced outwardly from the serpentine first fluid passageway 122 and into pipes 133 of the second fluid passageway 130.

With reference to FIGS. 1–3, a horizontal baffle plate 140, having first and second ends 141, 142 may be disposed in the upper end 50 of the separation tower 13, and is disposed substantially perpendicular to the longitudinal axis 52 of the separation tower. The horizontal baffle plate 140 is preferably disposed between the treated water outlet means 57 and the undesired liquid material outlet means 59, as shown in FIG. 1. A vertical baffle plate 145 having upper and lower ends 146, 147 may be connected to an end of the horizontal baffle plate 140, and preferably to the end 141 of baffe plate 140. Preferably, an angled baffle plate 148 is connected to the lower end 147 of the vertical baffle plate 145. Angled baffle plate 148, in combination with the vertical and horizontal baffle plates 145, 140 act to direct undesired liquid materials 60 away from the treated water outlet means 57 and toward the undesired liquid material outlet means 59.

Upon the contaminated water reaching its water level, or barometric standoff point 73 in holding tank 12 and the contaminated water level 74 within separation tower 13, contaminated water 14 may be continuously treated by water treatment apparatus 10. First and second electro-floculation means 11, 30, are operated as previously described, to disassociate ions from the undesired solid material 22 and from the contaminated water 14, as well as release undesired gaseous material 20 from the contaminated water. The undesired gaseous material 20 may be vented from the upper end 15 of holding tank 12, as well as be removed by the vacuum applying means 70 at the upper end 50 of separation tower 13. As previously described, undesired solid materials 22 may precipitate from the contaminated water 14 within holding tank 12 and may be removed upon operation of pump 24, which operation of pump 24 may also remove undesired solid materials 22 from the operation of first electro-floculation means 11, as previously described, as well as from the lower end 51 of separation tower 13, as also previously described. The undesired solid materials 22 contained within contaminated water 14 are subjected to contacting the previously described deflection means, as by contacting second deflection means 56, and in turn, contacting third deflection means 120, and in turn by contacting the first deflection means 55, to deflect undesired solid materials 22 downwardly to the lower end 51 of separation tower 13, in the manner previously described. As the contaminated water travels upwardly through separation tower 13, the treated water 58 may be removed through the treated water outlet means 57, and any undesired liquid material 60 may be removed by operation of the undesired liquid material outlet means 59, again as previously described.

Figure 9:
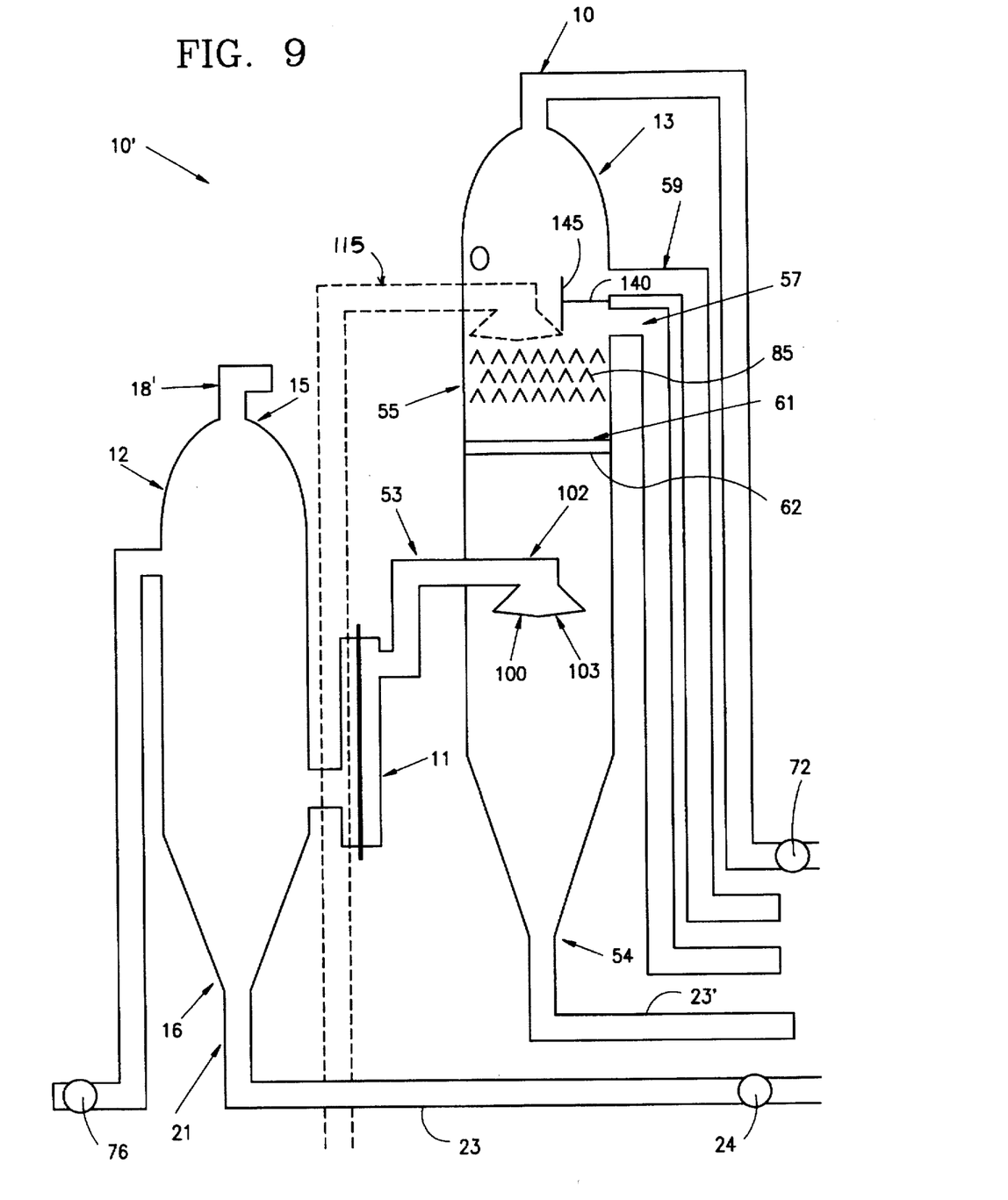
FIG. 9 is a partial cross-sectional view of another embodiment of the apparatus for treatment of contaminated water in accordance with the present invention.

With reference to FIG. 9, another embodiment of an apparatus 10' for treatment of contaminated water 14 is illustrated. The same reference numerals have been used for components having identical construction to those of the apparatus 10 illustrated in connection with FIG. 1. The operation of apparatus of 10' is essentially the same as the operation of apparatus 10 of FIG. 1. Apparatus 10', in contrast to apparatus 10 of FIG. 1, only utilizes a first deflection means 55 and a first electro-floculation means 11, and is illustrated to not include a second electro-floculation means, or second and third deflection means 56, 120.

It is to be understood that the invention is not limited to the exact details of construction, operation, exact materials or embodiment shown and described, as obvious modifications and equivalents will be apparent to one skilled in the art. For example, apparatus 10' could include some, or all of the additional components illustrated with apparatus 10, as well as the various deflection means may have other cross-sectional configurations than those illustrated. Accordingly, the invention is therefore to be limited only by the scope of the appended claims.

We claim:

1. A method for treating contaminated water contaminated with undesired solid, liquid, and gaseous materials, the method comprising the steps of flowing the contaminated water into a holding tank of an apparatus for treatment of contaminated water, the apparatus comprising a holding tank, having a top and a bottom, the holding tank including a means for venting the undesired gaseous materials from the contaminated water, and having a means for removing undesired solid materials from the contaminated water; and a separation tower, having upper and lower ends and a longitudinal axis, in fluid communication with the holding tank, the separation tower, including: a water inlet for the flow of contaminated water from the holding tank into the separation tower; a means for removing undesired solid materials from the contaminated water in the separation tower; deflection means in the separation tower for deflecting undesired solid materials in the contaminated water downwardly toward the lower end of the separation; a vacuum apparatus including a vacuum pump, the vacuum apparatus for applying a vacuum in and at the top of the separation tower for drawing the contaminated water from the holding tank through the water inlet and upwardly into, and through, the separation tower and for removing undesired gaseous materials from the contaminated water; electro-floculation means for disassociating ions from the undesired solid material and contaminated water and for releasing undesired gaseous materials contained in the contaminated water; a water level sensor in the separation tower for sensing a level of contaminated water therein, the water level sensor in communication with the vacuum pump for controlling the level of contaminated water in the separation tower, drawing the contaminated water from the holding tank into the separation tower with the vacuum apparatus, removing undesired gaseous materials from the contaminated water by the vacuum apparatus, disassociating ions from the undesired solid material and contaminated water and releasing undesired gaseous materials contained in the contaminated water by flowing the contaminated water through electro-floculation means, sensing a level of water in the separation tower, controlling the level of water in the separation tower with the vacuum apparatus in coordination with a level of water in the holding tank, flowing the contaminated water as the contaminated water is drawn upwardly through the separation tower against a first deflection means and deflecting undesired solid materials downwardly toward the lower end of the separation tower, flowing the contaminated water against a second deflection means to deflect undesired solid materials downwardly toward the lower end of the separation tower, removing treated water from the separation tower, from a first location proximate the upper end of the separation tower and above the first deflection means, removing undesired liquid material from the separation tower from a second location proximate the upper end of the separation tower and above the first location, and removing undesired solid materials from the holding tank and from the lower end of the separation tower.

2. The method of claim 1 wherein in the apparatus for treatment of contaminated water, water is maintained at a holding tank level in the holding tank by a pump for pumping water into the holding tank, said holding tank water level providing a barometric stand off point, the method further comprising providing a barometric stand off point in the holding tank to control the water level in said separation tower.

3. The method of claim 1 including the steps of heating and of cooling the contaminated water in the separation tower with a heat exchanger whereby upon heating the contaminated water, undesired liquid materials are separated from the contaminated water and rise toward the upper end of the separation tower, and upon cooling the contaminated water, undesired solid materials are cooled and move downwardly toward the lower end of the separation tower.

4. The method of claim 1 wherein the apparatus for treating contaminated water includes a heat exchanger for heating and for cooling the contaminated water in the separation tower, the heat exchanger being disposed proximate the upper end of the separation tower, whereby upon heating the contaminated water, undesired liquid materials will tend to be separated from the contaminated water and rise toward the upper end of the separation tower, and upon cooling the contaminated water, undesired solid materials will be cooled and tend to move downwardly toward the lower end of the separation tower, the method further comprising heating the contaminated water in the separation tower to effect rising of undesired liquid materials toward the upper end of the separation tower, and cooling the contaminated water to effect downward movement of undesired solid materials toward the lower end of the separation tower.

5. The method of claim 4 including the steps of flowing the contaminated water against a third deflection means to deflect undesired solid material in the contaminated water downwardly toward the lower end of the separation tower, the third deflection means disposed generally intermediate the first and second ends of the separation tower, utilizing as the third deflection means a plurality of baffle plates in a spaced apart relationship, and disposed within the separation tower, and at least some of the baffle plates angularly disposed with respect to the longitudinal axis of the separation tower and sloping at least some of the baffle plates downwardly toward the lower end of the separation tower, with at least some of the plurality of baffle plates defining a generally serpentine first fluid passageway; and flowing the contaminated water upwardly through the first fluid passageway to cause undesired solid materials striking the baffle plates to be directly downwardly toward the lower end of the separation tower, providing the separation tower with a second fluid passageway in fluid communication with the upper and lower ends of the separation tower and in fluid communication with the first fluid passageway defined by at least some of the baffle plates; and flowing the contaminated water upwardly through the first fluid passageway, and deflecting some undesired solid materials into the second fluid passageway and downwardly into the lower end of the separation tower, providing a horizontal baffle plate, having first and second ends, in the upper end of the separation tower and disposed substantially perpendicular to the longitudinal axis of the separation tower, the horizontal baffle plate being disposed between the first and second locations where treated water and undesired liquids are removed, providing a vertical baffle plate, having upper and lower ends connected to an end of the horizontal baffle plate, providing an angled baffle plate connected to the lower end of the vertical baffle plate, and directing undesired liquid materials away from the first location for removing treated water and toward the second location for removing the undesired liquid materials.

6. The method of claim 1 wherein in the apparatus for the treatment of contaminated water, the first deflection means is disposed proximate the upper end of the separation tower and above the contaminated water inlet; and the second deflection means is disposed proximate the lower end of the separation tower and above the contaminated water inlet.

7. The method of claim 1 wherein in the apparatus for the treatment of contaminated water the first and second deflection means comprises a plurality of deflection members disposed within the separation tower, and the deflection members in at least two generally parallel rows, with the deflection members of adjacent rows of deflection members being disposed in a staggered relationship with respect to each other.

8. The method of claim 1 including the step of flowing the contaminated water into the separation tower by spraying the contaminated water into the separation tower.

9. The method of claim 1 including the step of feeding the contaminated water into the separation tower at a plurality of locations.

10. The method of claim 1 wherein the electro-flocculation means is a first electro-flocculation means and a second electro-flocculation means and the method further comprising disassociating ions from the undesired solid materials and contaminated water with the second electro-flocculation means and releasing gaseous materials contained in the contaminated water, and the first and second electro-flocculation means comprising a cathode and an anode and passing an electrical current through the contaminated water as the contaminated water flows by the cathode and anode.

11. The method of claim 10 wherein the first electro-flocculation means is in fluid communication with, and between, the holding tank and the separation tower; and the second electro-flocculation means is in fluid communication with the holding tank and in a contaminated water inlet means for the holding tank.

* * * * *